UNITED STATES PATENT OFFICE.

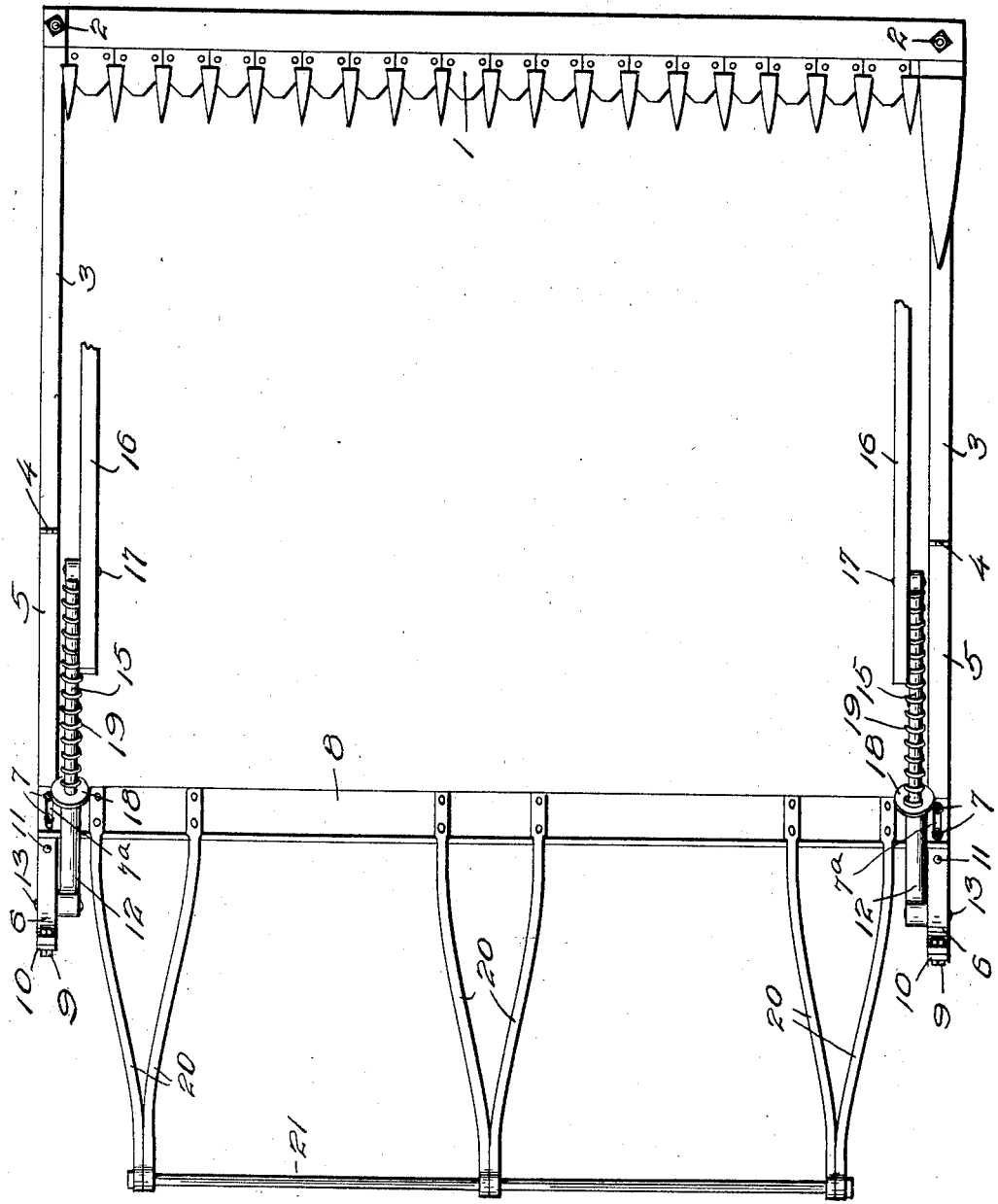

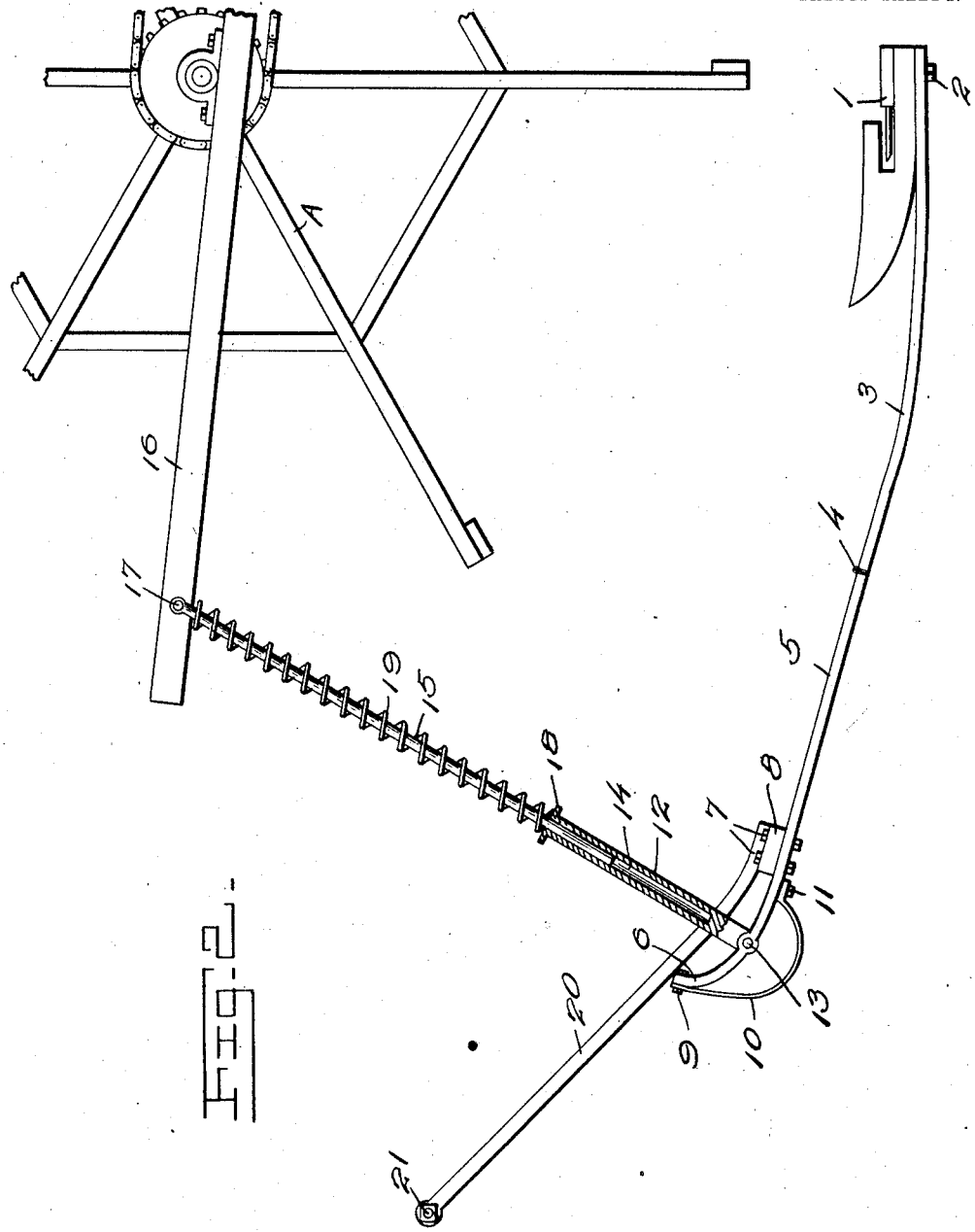

BENJAMIN KARST, OF NESS CITY, KANSAS.

ATTACHMENT FOR HARVESTERS.

998,526. Specification of Letters Patent. Patented July 18, 1911.

Application filed December 8, 1909. Serial No. 531,995.

*To all whom it may concern:*

Be it known that I, BENJAMIN KARST, a citizen of the United States, residing at Ness City, in the county of Ness and State of Kansas, have invented certain new and useful Improvements in Attachments for Harvesters, of which the following is a specification.

This invention relates to attachments for harvesters.

It has for its object the providing of a simple and efficient mechanism, by operation of which, weeds, cornstalks, etc., which have grown taller than the wheat will be left standing while the wheat is cut.

A further object of this invention is to provide a means for raising the attachment should an obstruction, such as a ditch, or the like, be encountered.

With these and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a part of this specification, and in which like numerals of reference indicate similar parts in the several views, Figure 1 is a top plan view of the mechanism mounted on a suitable harvester. Fig. 2 is a side elevation.

Referring to the drawings: 1 represents the cutting mechanism of a harvester, said harvester being no part of my invention, is not shown. To the cutting mechanism 1, by means of bolts 2 are attached brackets 3, which are slightly curved upward at the outer extremities. At the extremity and upper side of the brackets 3 are mounted hinges 4 to which are attached bars 5, which are curved upward, as at 6. Mounted transverse the bars 5, and attached thereto by bolts 7, which pass through the slots 7ᵃ in the bars 5, is the cross beam 8. Said slots 7ᵃ are provided for the purpose of allowing a lateral adjustment of the cross beam 8.

Attached to the extremities of the bars 5, by means of bolts 9, are curved steel springs 10, which bend around under the bars 5 and are attached at the other ends by means of bolts 11. These springs 10 are adapted to engage the ground, when on account of the roughness of same it becomes necessary that the mechanism should be raised. To the bars 5, by means of bolts 13, are attached upwardly extending members 12, pivoted on said bolts. Said members 12 are provided at their upper extremities with sockets 14, which contain the lower ends of the member 15, which project downwardly from and are pivotally mounted on the reel supports 16, by means of bolts 17. The members 12 have at their upper ends flanges 18, between which and the reel supports are mounted about the members 15, coil springs 19. The combination of the members 12 and 15, and the spring 19, serves to hold the bar 5 in the best operative position, and to allow vertical play of the cross beam 8, and its adjacent members, when the steel spring 10 comes in contact with obstructions.

To the cross beam 8 are fastened at suitable intervals, upwardly curved brackets 20, through the outer ends of which is secured a rod 21, extending parallel with the beam 8, said rod being preferably of iron.

A reel A is mounted on the reel supports in the usual manner.

As the harvester is moved forward, my mechanism works as follows: The standing grain and weeds meet the bar 21, which bends them over and they pass under the beam 8. The beam 8 is so adjusted that the wheat, which is shorter than the weeds, will pass wholly under the cross beam 8 and rise in time to be engaged by the reel A, which will present the stalks in position to be cut by the mechanism 1. The weeds, however, being longer than the wheat, will be held down by the beam 8 until the cutting mechanism will have passed partly over the stalks, whereby they will be held out of engagement with the reel and prevented from rising into position to be cut. The result of the action of my improved attachment is that the wheat will be cut and the weeds forced to the ground.

What is claimed is:

1. The combination with a mowing machine including a frame and a cutting mechanism, of brackets on said cutting mechanism, depressing means hinged to said brackets resilient means pivotally connected to said frame and slidably connected with the hinged depressing means on said brackets, said depressing means being arranged in front of the cutting mechanism and adapted to hold down vegetation exceeding a certain height for depression and passage under the cutting mechanism.

2. In a mowing machine including a frame and cutting mechanism, an attachment consisting of forwardly extending brackets secured to said cutting mechanism, bars hinged to the forward ends of said brackets a cross beam mounted on the forward ends of said bars, said cross beam being carried horizontally in front of the cutting mechanism to hold down vegetation exceeding a certain height for depression by and passage under the cutting mechanism, springs carried on the under sides of the forward ends of said bars, adapted to engage the ground, members pivotally connected with the bars, rods pivotally connected to the frame and slidably connected with said members, and springs on said rods engaging the frame and the members for yieldingly holding the said cross beam the proper distance from the frame.

3. In a mowing machine including a cutting mechanism, an attachment consisting of brackets attached at one of their ends to the cutting mechanism, bars hinged to the brackets a cross beam mounted on said bars, said cross beam being carried in front of the cutting mechanism, and adapted to engage and release vegetation of the predetermined height to the action of the cutting mechanism, and hold down vegetation exceeding such height for depression by and passage under the cutting mechanism, said cross beam having mounted thereon upwardly extending brackets and a cross bar carried by said bars in front of and parallel to said cross beam.

4. The combination with a mowing machine including a frame and cutting mechanism, of an attachment consisting of brackets on said cutting mechanism, bars hinged to said brackets, a cross beam removably supported on said bars, said cross beam being carried horizontally in front of the cutting mechanism to release vegetation of a predetermined height to the action of the cutting mechanism and hold down vegetation exceeding such height for depression by and passage under the cutting mechanism, said cross beam having upwardly extending brackets, mounted thereon, a cross bar carried by said brackets parallel to and in front of said cross beam, said bars having springs carried on their under sides for engagement with the ground, and spring pressed members connected with the frame and said bars for depressing the cross beam.

In testimony whereof I affix my signature, in presence of two witnesses.

BENJAMIN KARST.

Witnesses:
L. J. EGBERT,
L. C. LAVARS.

---

Copies of this patent may be obtained for five cents each, by addressing the "Commissioner of Patents, Washington, D. C."